(No Model.)
A. J. BRUNER.
GARDEN CULTIVATOR.
No. 467,149. Patented Jan. 19, 1892.
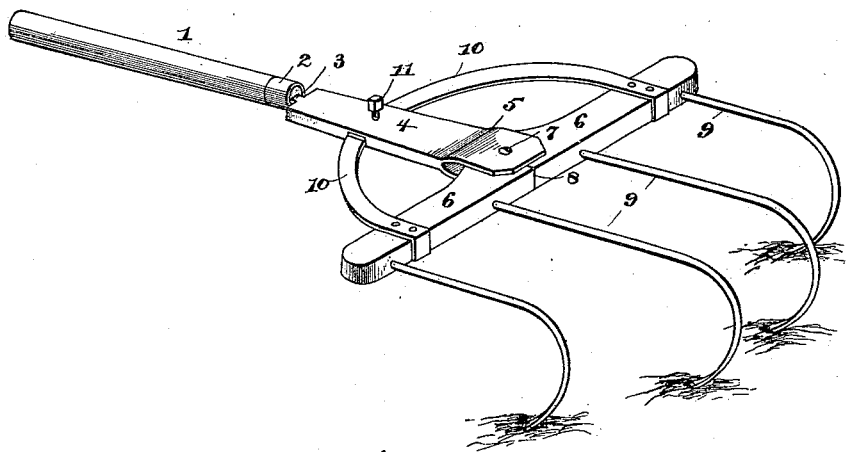
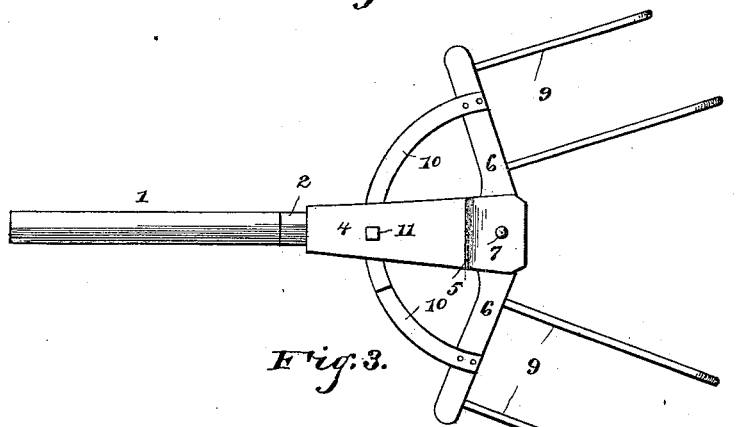
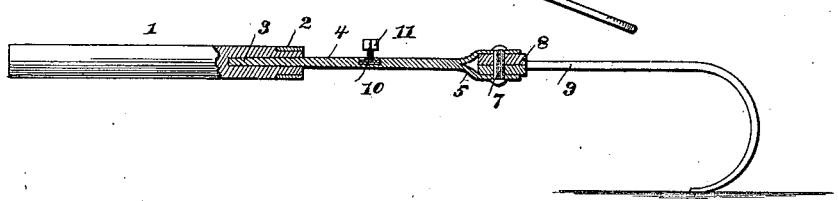
Witnesses
Inventor
Andrew J. Bruner,
By his Attorneys,

UNITED STATES PATENT OFFICE.

ANDREW J. BRUNER, OF MADISON, MISSOURI.

GARDEN-CULTIVATOR.

SPECIFICATION forming part of Letters Patent No. 467,149, dated January 19, 1892.

Application filed August 6, 1891. Serial No. 401,898. (No model.)

*To all whom it may concern:*

Be it known that I, ANDREW J. BRUNER, a citizen of the United States, residing at Madison, in the county of Monroe and State of Missouri, have invented a new and useful Garden Harrow, Rake, or Cultivator, of which the following is a specification.

This invention relates to improvements in garden harrows, rakes, or cultivators; and the objects in view are to provide a cheaply and simply constructed tool of the above character particularly designed for use in gardens and to be operated by hand, though, as will be hereinafter apparent, it may be manufactured upon larger scales and drawn by horses after the manner of the usual harrow or cultivator.

A further object of my invention is to provide for a convenient adjustment of the teeth relative to each other, whereby they may be especially adapted for cultivating between rows of plants.

Various other objects and advantages of the invention will appear in the following description, and the novel features thereof will be particularly pointed out in the claim.

Referring to the drawings, Figure 1 is a perspective of a harrow or cultivator constructed in accordance with my invention. Fig. 2 is a plan, the teeth of the same being set or adjusted to cultivate between rows. Fig. 3 is a longitudinal section.

Like numerals of reference indicate like parts in all the figures of the drawings.

1 designates the handle, provided at its lower end with the ferrule 2 and receiving at said end the reduced tang 3 of the shank 4. The shank 4 is gradually widened toward its front end and is split or slotted from in front of its tang to its front end, as at 4, verged slightly, as at 5, for the purpose of embracing the sectional harrow or cultivator bars.

6 designates a pair of bar-sections, the same having their inner ends at opposite sides reduced and overlapped and embraced by the front ends of the shank 4. A pin 7 passes through the shank and the overlapped ends of the bars, which pin serves to pivotally connect the bars to the shank. Shoulders 8 are formed at the inner ends of the bars and at the front faces thereof, whereby the latter are prevented from passing out of alignment in one direction, while at the same time each bar is perfectly free to swing to the rear. From each of the bars there extends rearwardly a pair or a series of curved harrow, rake, or cultivator teeth 9, which, it will be seen, may be spread apart by a proper adjustment of the bars. From each of the bars there extends rearwardly a quadrant-shaped hound 10, the ends of the two hounds overlapping and passing through the slot of the shank 4. A binding-screw 11 passes through the shank and serves to clamp the hounds in any of their adjusted positions. It will thus be seen that I provide a garden rake, harrow, or cultivator of great simplicity and capable of various adjustments to suit different purposes. When the bars are in alignment, they form an efficient drag harrow, rake, or cultivator, and by swinging the same to the rear and securing them in their adjusted positions by means of the shank-plates and binding-screws said harrow or cultivator is adapted to straddle and cultivate between rows of plants of various kinds.

By means of the adjustment the harrow or cultivator may be adapted for cultivating between rows of various widths, as oftentimes plants are planted in rows close together and at other times wide apart.

If desired, and as before stated, it will be evident that ordinary draft appliances may be substituted for the handle herein shown and described, and the harrow or cultivator, being built upon a larger scale, may be used for larger work and adapted to be drawn by horses.

Having described my invention, what I claim is—

In a cultivator, the combination, with the draft-bar or handle, and the shank bifurcated at its front end, in rear of the same provided with a transverse slot, and at its front end connected to the handle, of the opposite harrow-bars having their inner ends overlapped and pivoted between the bifurcations of the shank and provided at their front meeting edges or ends with shoulders, whereby they are prevented from being swung rearwardly beyond a point of alignment, the teeth extending rearwardly from the bars, the quadrant-shaped hounds secured at their rear ends to the bars and having their front ends overlapped and passed through the transverse recess of the shank, and the set-screw passed through a perforation in the shank and terminating upon the hounds, substantially as specified.

In testimony that I claim the foregoing as my own I have hereto affixed my signature in presence of two witnesses.

ANDREW J. BRUNER.

Witnesses:
JESSE LEWIS,
J. W. JOHNSTON.